(12) United States Patent
Scholz et al.

(10) Patent No.: US 7,756,207 B2
(45) Date of Patent: Jul. 13, 2010

(54) METHOD FOR PRE-PROCESSING BLOCK BASED DIGITAL DATA

(75) Inventors: Alexander Scholz, Stuttgart (DE); Altfried Dilly, Stuttgart (DE); Jörg Tappermann, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1138 days.

(21) Appl. No.: 11/036,274

(22) Filed: Jan. 13, 2005

(65) Prior Publication Data

US 2005/0281338 A1    Dec. 22, 2005

(30) Foreign Application Priority Data

Jan. 14, 2004   (EP) ................................ 04000626

(51) Int. Cl.
*H04N 7/12* (2006.01)
(52) U.S. Cl. ............................. 375/240.29; 375/240.01
(58) Field of Classification Search ............. 375/240.29
See application file for complete search history.

(56) References Cited

U.S. PATENT DOCUMENTS

| 4,665,556 A | | 5/1987 | Fukushima et al. | |
|---|---|---|---|---|
| 5,602,984 A | * | 2/1997 | Mieras ........................ | 345/557 |
| 5,696,698 A | * | 12/1997 | Herluison et al. ............. | 345/557 |
| 7,313,185 B2 | * | 12/2007 | Ma et al. ................ | 375/240.16 |

FOREIGN PATENT DOCUMENTS

EP    0 222 405    5/1987

WO    WO 00/38068    6/2000

OTHER PUBLICATIONS

Demassieux N et al: "VLSI Architecture for a One Chip Video Median Filter" International Conference on Acoustics, Speech & Signal Processing. ICASSP. Tampa, Florida, Mar. 26-29, 1985, New York, IEEE, US, vol. 3, Conf. 10, Mar. 26, 1985, pp. 1001-1004, XP000745527.

Fadavi-Ardekani J et al: "Architecture, applications and design of a video FIR filter IC", pp. 622-626, XP010084887.

Bull D R et al: "Bit-serial digital filter architecture using RAM-based delay operators" IEEE Proceedings: Circuits Devices and Systems, Institution of Electrical Engineers, Stenvenage, GB, vol. 141, No. 5, Oct. 1, 1994, pp. 371-376, XP006001539.

Chakrabarti C et al: "Median filter architecture based on sorting networks" Proceedings of the International Symposium on Circuits and Systems. San Diego, May 10-13, 1992, Proceedings of the International Symposium on Circuits and Systems. (ISCAS), New York, IEEE, US, vol. 4 Conf. 25, May 3, 1992, pp. 1069-1072, XP010061416.

* cited by examiner

*Primary Examiner*—Andy S. Rao
*Assistant Examiner*—Geepy Pe
(74) *Attorney, Agent, or Firm*—Oblon, Spivak, McClelland, Maier & Neustadt, L.L.P.

(57) ABSTRACT

A method for pre-processing block-based digital data that pre-processes each digital pixel based on a respective data filter arrangement or data filter matrix for a respective data pixel within at least one data block and selects, constructs, and/or supplies the data filter arrangements or data filter matrices. The method is based on operations of data shifting and/or register shifting only.

13 Claims, 14 Drawing Sheets

METHOD FOR PRE-PROCESSING BLOCK BASED DIGITAL DATA

BACKGROUND

The present invention relates to a method for pre-processing block-based digital data and in particular to a method for pre-processing block-based digital video data. More particular, the present invention relates to a method and a circuit for realizing a cash buffer for filtering block-based digital data and in particular block-based digital video data.

The present invention applies to the field of processing digital data and in particular to the field of processing digital video data. In known video processing methods and video processing systems before processing said digital data and in particular said digital video data sometimes a data selection is necessary in the sense that provided digital data or provided digital video data to be processed based on a block structure have to be arranged and/or selected by building blocks of said digital data or said digital video data. Therefore, it is necessary to filter the incoming or provided digital data or digital video data in a two-dimensional manner, i.e. by using a digital spatial two-dimensional filter or two-dimensional FIR filter with respect to the provided or incoming digital data items or digital data pixels.

SUMMARY

It is an object of the present invention to provide a method for pre-processing digital data or digital video data and a system for realizing said method, which have a particular simple and reliable structure.

The object is achieved by a method for pre-processing block-based digital data according to the characterizing features of independent claim 1. Preferred embodiments are defined within the dependent subclaims. The object is further achieved by a system for pre-processing block-based digital data according to a computer programmed product and a computer-readable storage medium.

The inventive method for pre-processing block-based digital data is in particular designed for pre-processing block-based digital video data. According to the present invention it is provided that for at least one data block of digital data for each data item or a data pixel a data sub-arrangement or data sub-matrix is provided, generated, and/or used as an assigned data filter arrangement or data filter matrix. I.e. in more detail: According to the present invention it is provided that for at least one data block of digital data—said data block being contained or embedded in a data arrangement or a data matrix of data items or data pixels—for each data item or a data pixel of said data items or data pixels of said at least one data block within said data arrangement or data matrix a data sub-arrangement or data sub-matrix that is assigned for or to said respective data item or data pixel within said respective data block of said data arrangement or data matrix is provided, generated, and/or used as a assigned data filter arrangement or data filter matrix. Further, a pre-processing step is performed for each of said data items or data pixels within said at least one data block based on the respective data filter arrangement or data filter matrix for the respective data item or data pixel within said at least one data block. According to the present invention a step of selecting, constructing and/or supplying said data filter arrangements or data filter matrices is essentially based on operations of data shifting and/or register shifting only.

It is therefore a basic idea of the present invention to realize and/or provide the data filter arrangements or data filter matrices that are necessary for a step of pre-processing the data items or data pixels of a given data block of digital data by using data shift operations and/or register shift operations only. Therefore, only a single process of data loading is necessary with respect to the respective data block and the embedding data arrangement. Further, the shift operations or register shift operations have a particular simple structure and can be realized by compared simple technical means, thereby realizing a simple, reliable and less time-consuming strategy for selecting, constructing and/or supplying the necessary data filter arrangements.

According to a preferred embodiment of the present invention said respective data item or data pixel and said assigned data filter arrangement or data filter matrix are chosen to be based on a certain positional relationship with respect to each other and/or with respect to the respective data block to be pre-processed.

It is of particular advantage if said respective data item or data pixel is positioned in a central region of the respective assigned data filter arrangement or data filter matrix.

More advantageously, said respective data item or data pixel is the central data item or data pixel of the respective assigned data filter arrangement or data filter matrix.

According to a preferred embodiment of the inventive method for pre-processing block-based digital data said respective data arrangement or data matrix are chosen and designed to have a rectangular form of a given certain number of lines or rows and of a given certain number of columns of data items or data pixels.

It is of further advantage to design the respective data block to be pre-processed with a given certain number M of lines or rows and a given certain number L of columns of M×L data items or data pixels.

It is of further advantage to choose or design said data filter arrangement or said data filter matrix with a rectangular form having a given certain—in particular odd—number K of lines or rows and a given certain—in particular odd—number J of columns of data items or data pixels.

According to a preferred embodiment of the inventive method for pre-processing block-based digital data said step of selecting, constructing and/or supplying said data filter arrangements and/or said data filter matrices and in particular said operations of data shifting and/or register shifting are essentially based on and/or are essentially performed using an embedding data block which contains and/or embeds said respective data block to be pre-processed—or a copy thereof—and said data filter arrangements and/or data filter matrices—or copies thereof—and which is common for all of said data filter arrangements and/or for all of said data filter matrices assigned to each of said data items and/or data pixels of said data block to be pre-processed. According to the particular measure said embedding data block is used to evaluate and to pre-process the selected data block to be pre-processed. It is a further basic aspect of the present invention to choose and design the respective embedding data block. The data of said embedding data block has to be chosen and stored only one time. Based on the embedding data block the respective shifting operations or register shifting operations lead to the data filter arrangements or data filter matrices in a straightforward and sequential manner.

According to a further aspect of the present invention said embedding data block is chosen and/or designed to have a rectangular form of M+K−1 lines or rows and of L+J−1 columns of digital items or digital pixels of said data arrangement and/or of said data matrix.

Additionally or alternatively, for all data filter arrangements and/or for all data filter matrices for a given data block to be pre-processed a common and fixed filter mask area within said embedding data block may be used for said step of selecting, constructing, and/or supplying said data filter arrangements and/or said data filter matrices.

Further additionally or alternatively, said filter mask arrangement may be chosen to be simply connected corner block, in particular of rectangular form and/or of K lines or rows and of J columns of data items or data pixels of said embedding data block.

According to a preferred embodiment of the inventive method for pre-processing block-based digital data said respective data block is pre-processed row by row or line by line, in particular starting with a top row or top line of said data block to be pre-processed and/or in particular pre-processing the rows or lines of said data block in their sequential order. Of course, the processing can also be performed starting with a button row and pre-processing the rows of the data block inverse to their sequential order. Alternatively also a pre-processing column by column is possible either from left to right or from right to left in their sequential order inverted to their sequential order, respectively.

In all these cases within each row or line (column) the respective data items or data pixels are pre-processed in their sequential order with respect to the columns (rows or lines) of the data block to be pre-processed, in particular starting with a first or most left data item or data pixel in the respective row or line.

It is of further advantage when according to a further preferred embodiment of the present invention within said step of selecting, constructing and/or supplying said data filter arrangements and/or said data filter matrices an order is used which corresponds to the order of pre-processing said respective data items and/or data pixels within said respective data block to be pre-processed. According to this measure a direct correspondence or assignment between the pixels of the data block to be pre-processed and the data filter arrangements and/or data filter matrices is realized in a particular simple and reliable manner.

According to a further preferred embodiment of the present invention the shift operations may be chosen from the group, which consists of the following operations:

(a) All data items and/or data pixels of the embedding data block are shifted one step to the left, i.e. in each line to the next lower indexed column (j:=J−1) and in the case of a data item and/or data pixel of a first column (j=1) to the last column (j=L+J−1) of the next lower indexed row or line (k:=k−1). The respective data item and/or data pixel is cancelled from the embedding data block if it is in the first column (j=1) of the first line (k=1).

(b) All data items and/or data pixels of the embedding data block are shifted by one row or line to the top, i.e. for each line (k=1, . . . , M+K−1) all data items and/or data pixels of the last L−1 columns are shifted J steps to the left, i.e. to the respective J-times lower indexed column (J:=J−J). Simultaneously, for each but the first line (k=2, . . . , M+K−1) all data items and/or data pixels of the first J columns (j=1, . . . , J) are shifted to the last J columns (J=L, . . . , L+J−1) of the next lower indexed row or line (k:=k−1). In the case of the first line (k=1) the respective data items and/or data pixels of the first J columns are cancelled from the embedding data block.

According to the present invention the step of selecting, constructing, and/or supplying said data filter arrangement and/or said data filter matrices is realized by the following steps:

The respective embedding data block is loaded.

The data block DB to be pre-processed is pre-processed by starting with the most left upper data item and/or data pixel of said data block DB to be pre-processed, i.e. with the data item and/or data pixel of said data block DB to be pre-processed having row and column indices 1 and 1 within the data block DB to be pre-processed. This is done by using the section of the embedding data block as a respective data filter arrangement and/or data filter matrix which is given by or corresponding to said common filter mask area which is in particular in a fixed spatial relationship to the embedding data block for all data filter arrangements and/or for all data filter matrices, i.e. for all pixels within said data block to be pre-processed.

The further data blocks and/or data pixels are pre-processed by applying the shift operation (a)—as described above—(L−1) times for all M lines, whereas the shift operation (b)—as described above—is applied (M−1) times. In other words, the further data blocks and/or data pixels are pre-processed by sequentially (M−1) times applying for each line (L−1) times the shift operation (a) followed by an shift operation (b) and by using the respective section of the embedding data block as a respective data filter arrangement and/or data filter matrix which is given by and/or corresponding to said common filter mask area after each of said shift operation (a) and after each of said shift operation (b).

According to a further preferred embodiment a shift register is used to realize and/or to store said embedding data block and in particular said common filter mask area. Said shift register has in particular M+K−1 lines or rows and L+J−1 columns of pixel registers or pixel storing elements.

In this case each of said pixel storing elements or pixel registers may be provided with a 3-input multiplexers as to realize a selection of one of the above described shift operations (a) and/or (b).

It is of further advantage to control the inventive method for pre-processing block-based digital data by a state machine and/or by a state machine process.

According to a further aspect of the present invention a system, apparatus, or device is provided which is adapted and/or designed to realize and/or to perform the inventive method for pre-processing block-based digital data and the steps thereof.

According to another aspect of the present invention a computer program product is provided which comprises computer program means being adapted to realize and/or to perform the inventive method for pre-processing block-based digital data and/or the inventive system for pre-processing block-based digital data when it is executed on a computer, a digital processing means and/or the like.

Additionally, a computer readable storage medium is provided and comprises the inventive computer program product. The computer readable storage medium may include, without limitation, an electronic memory, CD-ROM, FLASH Memory, Hard Disk Drive, or other computer-readable media known in the art.

In the following these and further aspects of the present invention will be explained in further detail:

The present invention particularly relates inter alia to a method and to a circuit of cache buffering for filtering block based video data.

The here described invention applies to a digital video processing system, where each field out of a sequence of video fields is split into a number of rectangular blocks with a size of L×M pixels each. Such video processing systems are used for e.g. motion estimation or format conversion applications. This is according to the fact that block based video field processing helps minimizing the data access bandwidth to the main video memory. This invention describes the method and structure of a cache buffer that enables a simple processing of video blocks with a size of L×M pixels by a digital spatial 2D FIR filter with J×K parallel input pixels e.g. used for noise reduction or picture sharpness improvement. The here described cache buffer has a simple and regular structure, which makes it easy to implement in programmable logic or ASIC.

This invention describes a method of filtering video data in a block based video processing system by a spatial 2D filter. A possible solution of the problem could be, to store the video data in a fixed register-matrix and select the filter input data by multiplexers. However this approach would increase the number of logic gates and signal delay time significantly, especially at filters with many parallel input pixels, where wide-range multiplexers are needed. The here described idea of storing pixel data in a shift register, whose output lines are directly connected to the input of the filter, helps to keep the number of logic gates low and allows an easy adaptation to different filter sizes. Due to the scaleable architecture, the signal delay time and therefore the system speed are not influenced by the filter size.

The present invention therefore covers inter alia a shift register with above mentioned properties and structure and a state-machine to control the switching behavior of this shift register.

BRIEF DESCRIPTION OF THE DRAWINGS

In the following these and further aspects of the present invention will be described in further detail by taking reference to the accompanying figures.

DETAILED DESCRIPTION

In the following, similar elements, structures and functionalities are denoted by the same reference symbols. A detailed description is not given in each case of their occurrence.

Figure 1:
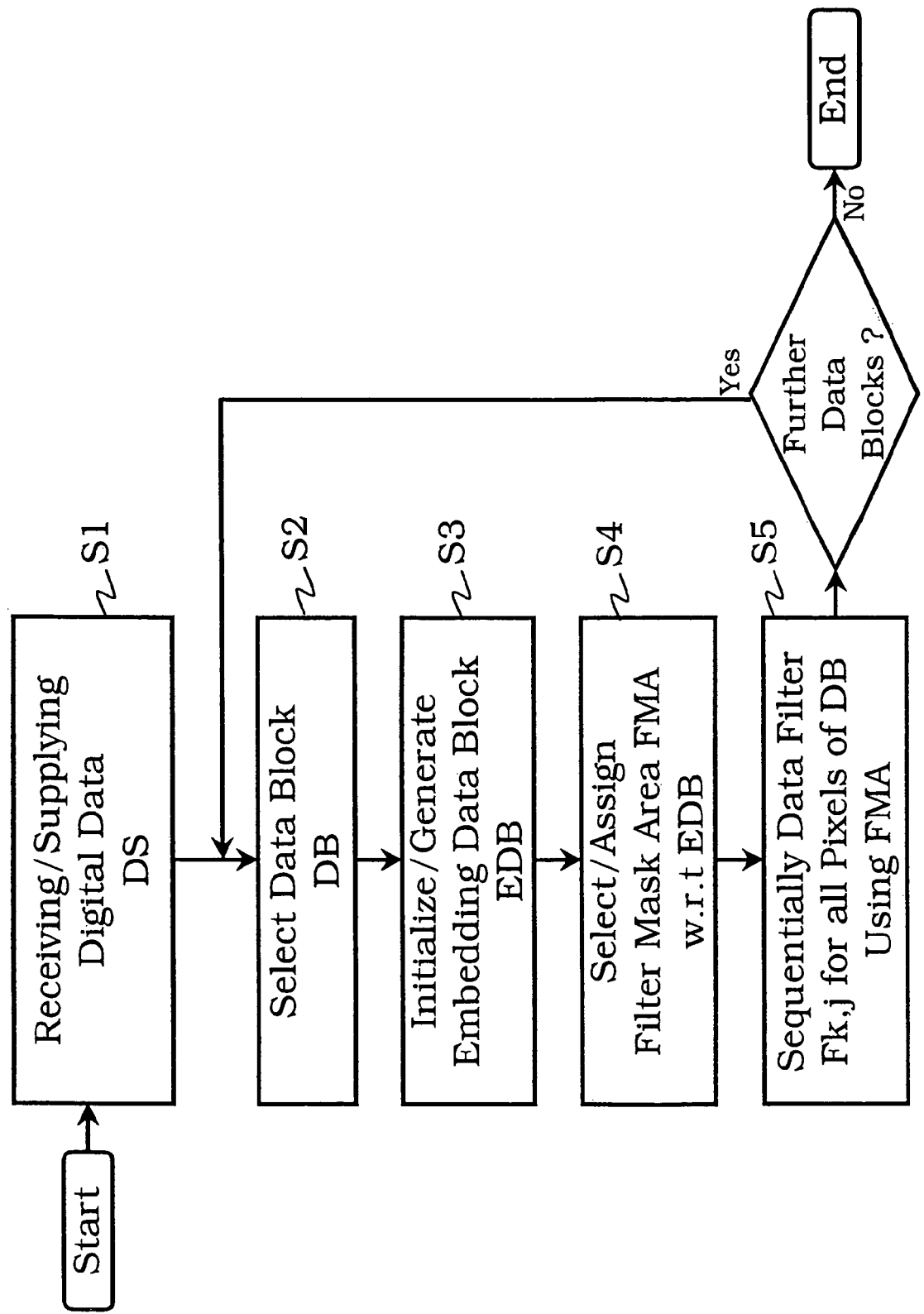
FIG. 1 is a schematical block diagram demonstrating several basic aspects of the inventive method for pre-processing block-based digital data.

FIG. 1 is a schematical block diagram that elucidates some basic aspects of the inventive method for pre-processing block-based digital data.

Figure 2:
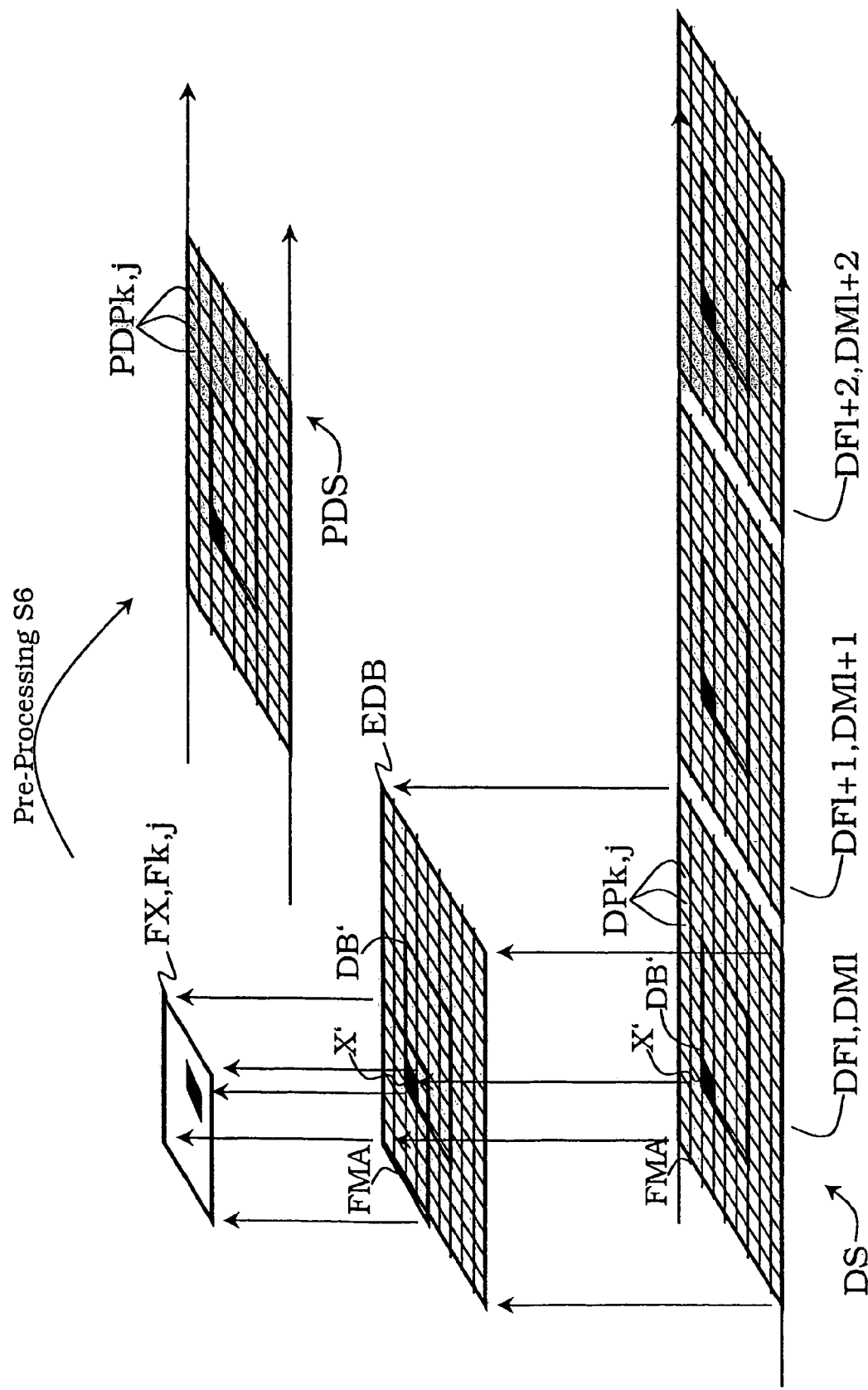
FIG. 2 demonstrates some relationships of the different data structures used within the present invention.

Within a first step S1 said digital data to be pre-processed are received and/or supplied in the form of a digital data stream DS. Within a second step S2 a certain data block DB to be pre-processed is selected. Within a third step S3 an embedding data block EDB is generated and/or initialized. Any shift operation or data shift operation according to the present invention is performed on the embedding data block EDB which is a copy of a respective data section contained in or embedded in the received data stream DS. Within a fourth step S4 a filter mask area FMA is generated, selected, and/or assigned. Said filter mask area is common for all pixels of the selected data block DB to be pre-processed and consequently common for all data filter arrangements and/or data filter matrices for each of said pixels within said data block DB on the basis of which the pre-processing of each of said respective pixels within said data block DB is performed within a following step S5. Step S5 may be followed by an optional pre-processing step S6 which is indicated in FIG. 2. After having finished the processing of the entire data block DB it is checked on whether or not a further data block DB has to be pre-processed in which case the processing of FIG. 1 branches again to the second step S2 of selecting a further data block DB to be pre-processed. Otherwise, the process shown in FIG. 1 ends.

FIG. 2 schematically describes the relationship between the different data structures used within the inventive method for pre-processing block-based digital data.

Digital data are—as already indicated with respect to FIG. 1—as a digital data stream DS. After pre-processing the digital data contained in the digital data stream DS a processed digital data stream PDS is obtained. The digital data stream DS is built up by data fields DF1 . . . , DFn. Each data field DF1 . . . , DFn is built up by a data matrix DM1, . . . , DMn. In the situation shown in FIG. 2 a certain given data field DF1 is subjected to a pre-processing step. Therefore the respective data matrix DM1 is selected. Within said data matrix or data arrangement DM1 a certain data block DB to be pre-processed is selected. The respective data arrangement or data matrix DM1 and therefore the data block DB to be pre-processed is built up by respective data items or data pixels DPk,j which are selected as selected data items or data pixels X in their sequential order.

It is important to choose and select an embedding data block EDB which is a copy of the respective data region within the respective selected data matrix DM1 of the provided data stream DS. The embedding data block EDB is chosen and designed to be an embedding for the selected data block DB to be pre-processed as well as for the respective data filter arrangements or data filter matrices Fk,j which have to be constructed for each of the selected pixels X, X' of the selected data block DB, DB'. Additionally a filter mask area FMA is selected within the embedding data block EDB at a fixed position. Therefore a common filter mask area FMA for all possible data filter arrangements and/or data filter matrices Fk,j is built up. The data which coincide with the respective filter mask area FMA are copied and used as said data filter arrangement and/or as said data filter matrix Fk,j for each of the pixels X, X' which are selected from the data block DB, DB'.

By using data shift operations only which are applied to the embedding data block EDB the copied data within the embedding data block EDB are shifted in a way that the fixedly positioned filter mask area FMA sees the respective data within the embedding data block which correspond to the respective data filter arrangement and/or the respective data filter matrix Fk,j which corresponds to the selected data item or data pixel X, X' of the plurality of pixels DPk,j within the copy DB' of the data block DB, thereby selecting and providing the data section defined by the filter mask area FMA within the embedding data block EDB as a data filter arrangement or data filter matrix Fk,j on the basis of which the pre-processing step S5 of FIG. 1 is performed so as to yield on the basis of said data filter arrangement or data filter matrix Fk,j a pre-processed selected data item or data pixel X which corresponds to the respective pre-processed data pixel DPk,j within the pre-processed digital data stream PDS.

These relationships hold for each of said selected data pixels or data items X within the selected data block DB to be pre-processed, and further for all selected data blocks DB of a selected data arrangement or data matrix DM1 constituting the data fields DF1 within the received digital data stream DS.

Figure 3:
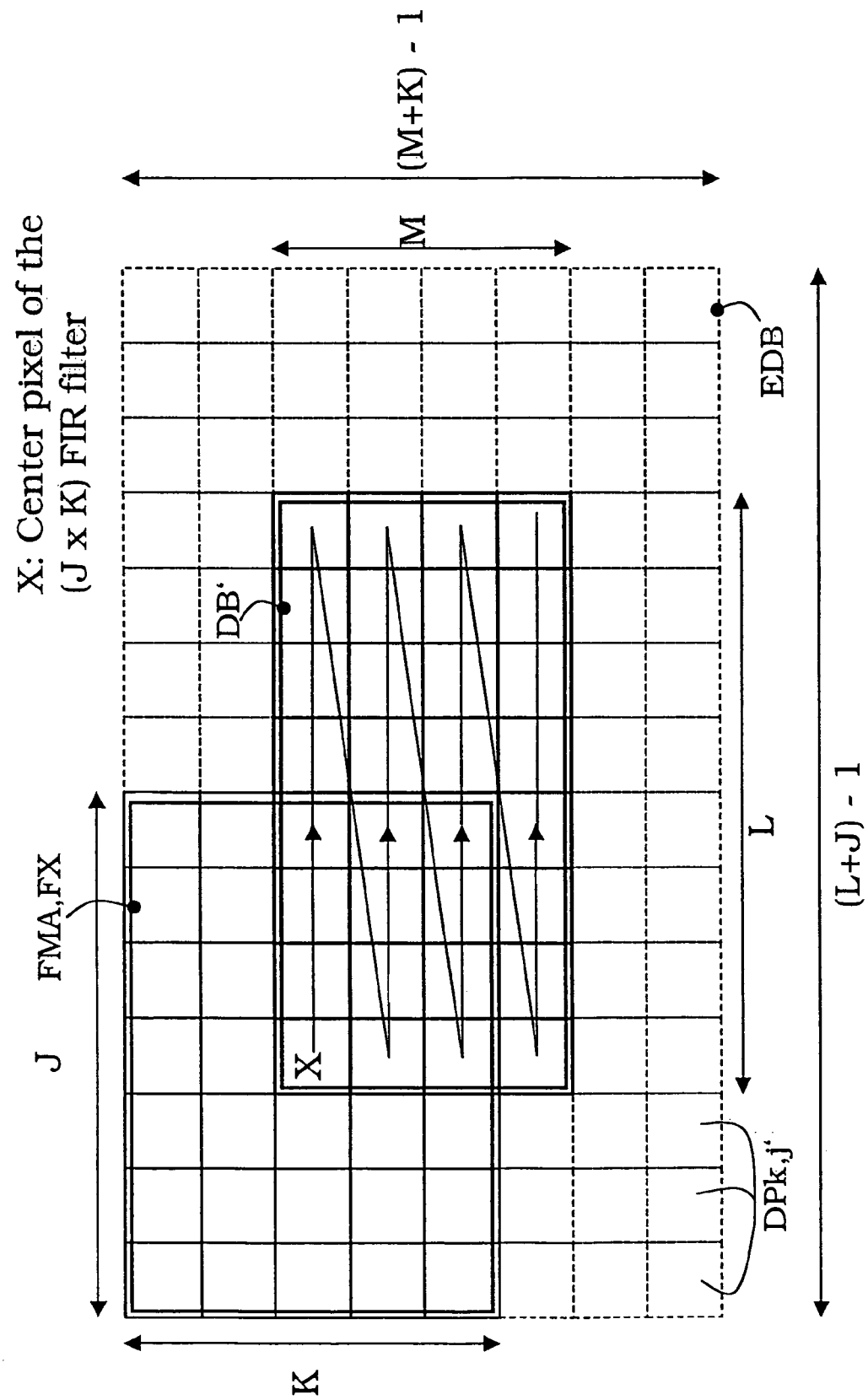
FIG. 3-4D schematically describe further aspects of the data structures used within the present invention.
Figure 4A:
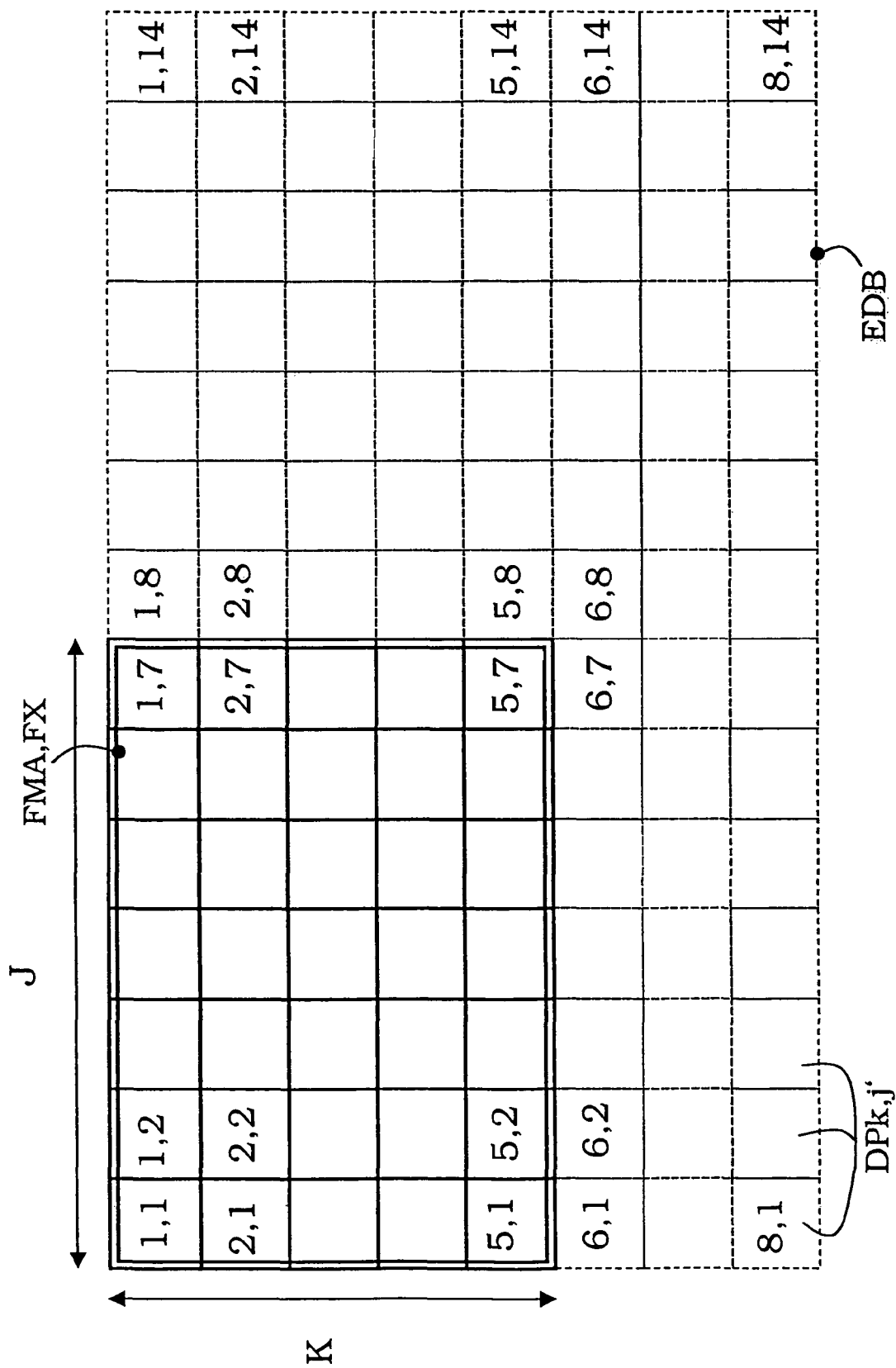
Figure 4B:
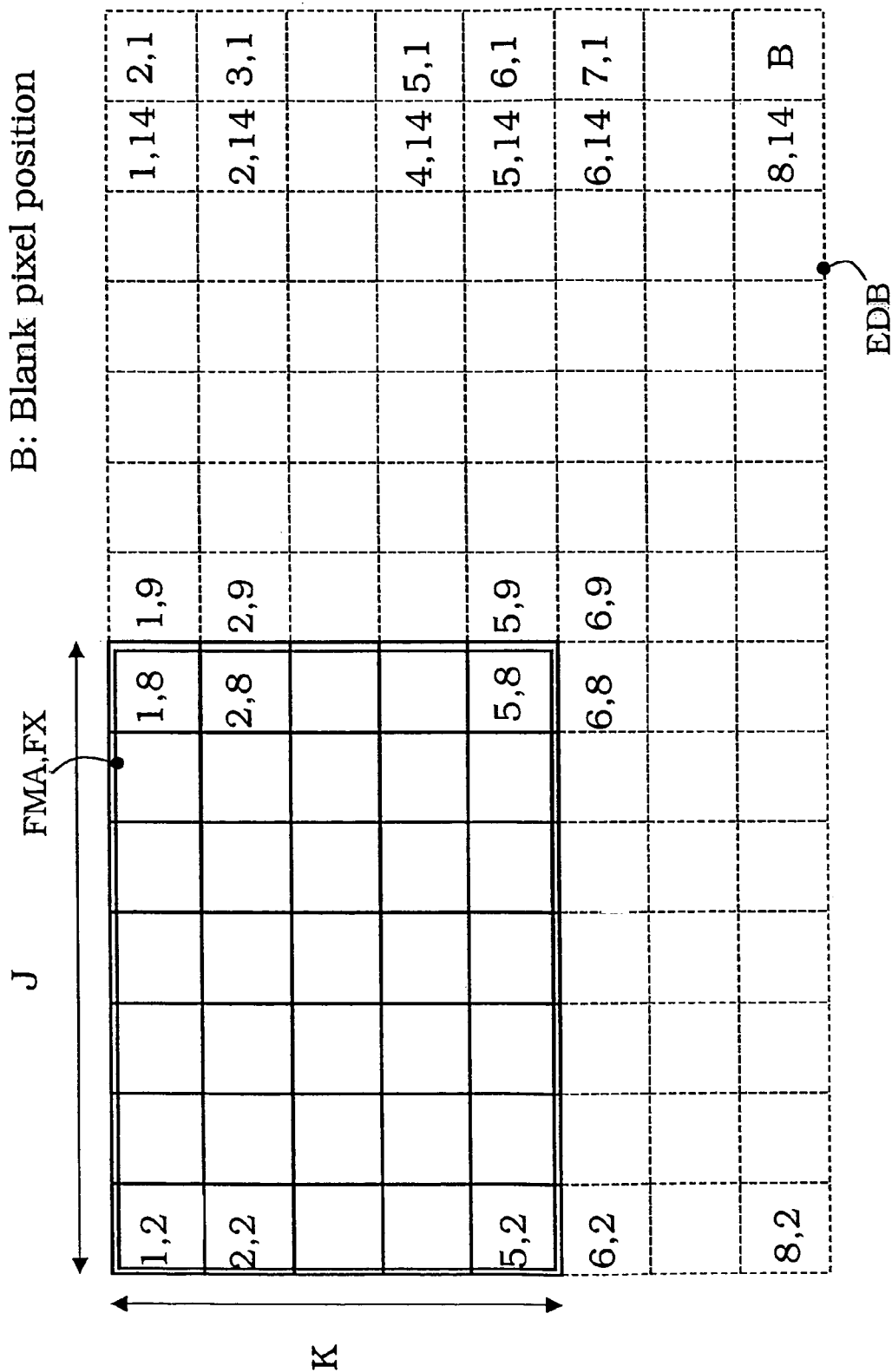
Figure 4C:
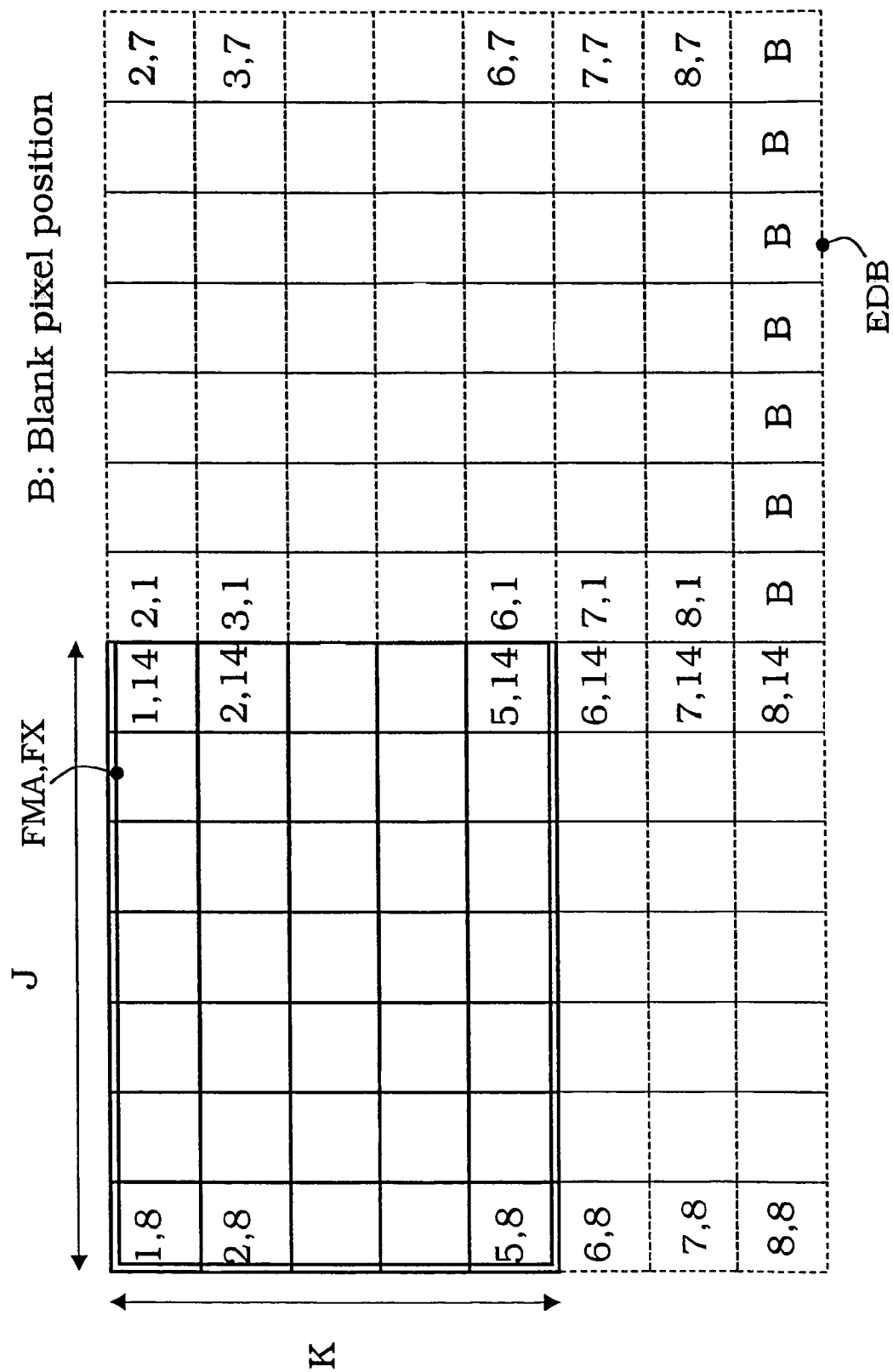
Figure 4D:
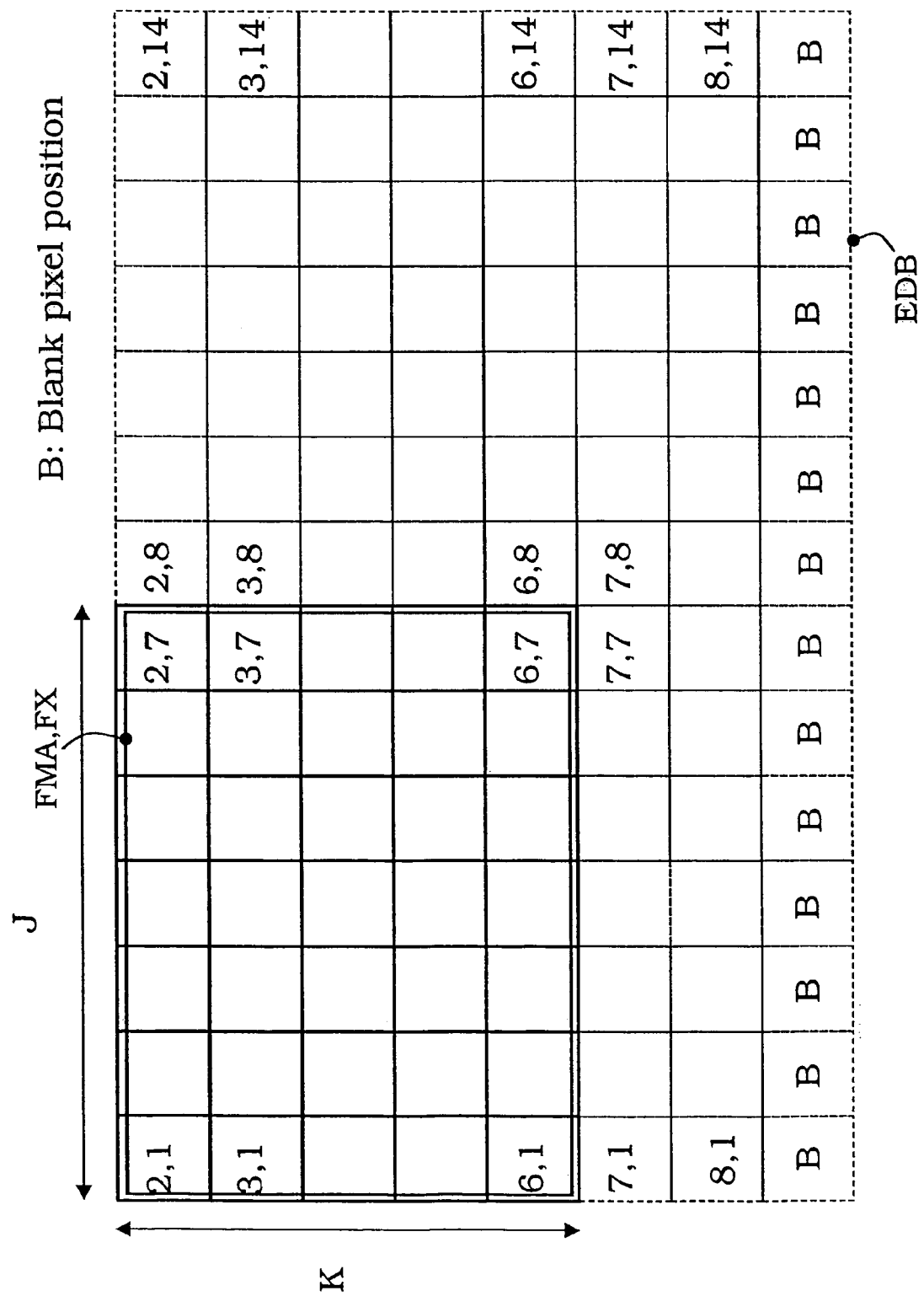

FIG. 3 to 4D schematically describe several aspects of the signals and/or data structures used within the present invention.

The pre-processing of a data block of L×M data pixels DPk,j by a 2-dimensional J×K sized FIR filter is shown in FIG. 3.

As an example a data block DB of 8×4 pixels is filtered by a 7×5 filter or data filter arrangement or data filter matrix Fk,j. This means that for each pixel X of the data block DB to be pre-processed J×K=35 parallel input data pixels DPk,j are needed to be processed to give one resultant pre-processed data pixel PX in a processed data block PBK said pre-processed data pixel PX corresponding to said given data pixel X. The resultant pixel PX is usually located in the center of the J×K matrix, therefore J and K are usually odd numbers. The J×K filter Fk,j moves over the L×M data block DB by shifting the data pixels DPk,j through the fixedly positioned filter mask area FMA. This is realized in the following way:

The pre-processing starts with the upper left pixel of the L×M data block DB. The processing order of the L×M data pixels is from left to right. At the end of each line or row, the pre-processing continues with the first pixel of the next line until all L×M pixels are processed. Dependent on the values J and K of the filter, data pixels from adjacent blocks are involved in the processing. Therefore, a total amount of [(L+J)−1]×[(M+K)−1] data pixels is needed to process a block of L×M data pixels.

All mentioned shift operations and their effect on the filter input are demonstrated in FIG. 4A-4D.

The example shows the embodiment of an 8×4-pixel video-processing block with a 7×5 FIR-filter mask or filter mask area FMA. Including overlapping pixels from adjacent blocks, a total of 14×8 pixels are involved in the processing. The first 7 pixels of the first 5 lines are connected to the 7×5 filter. FIG. 4A shows the initial state of the shift register after reload operation. New pixel positions after the first shift operation are shown in FIG. 4B. The second pixel of each line now moved to the first position of the 7×5-filter mask, the third pixel to the second position and so on. This is equivalent to moving the 7×5-filter mask one position to the right. The pixel shift is continued (L−1) times, until the last pixel of the first line is processed. At the end of the first line, pixels are in the position shown in FIG. 4C. Now the filter mask jumps to the beginning of the next line. As the video-processing filter has a width of J=7 pixels, all pixels inside the shift register are therefore shifted left by 7 positions. This brings the pixels of the former second line to the first line of the 7×5-filter as is shown in FIG. 4D. Then processing continues with the second line of the 8×4 block and so on, until all pixels in the 8×4 block are processed.

Figure 5:
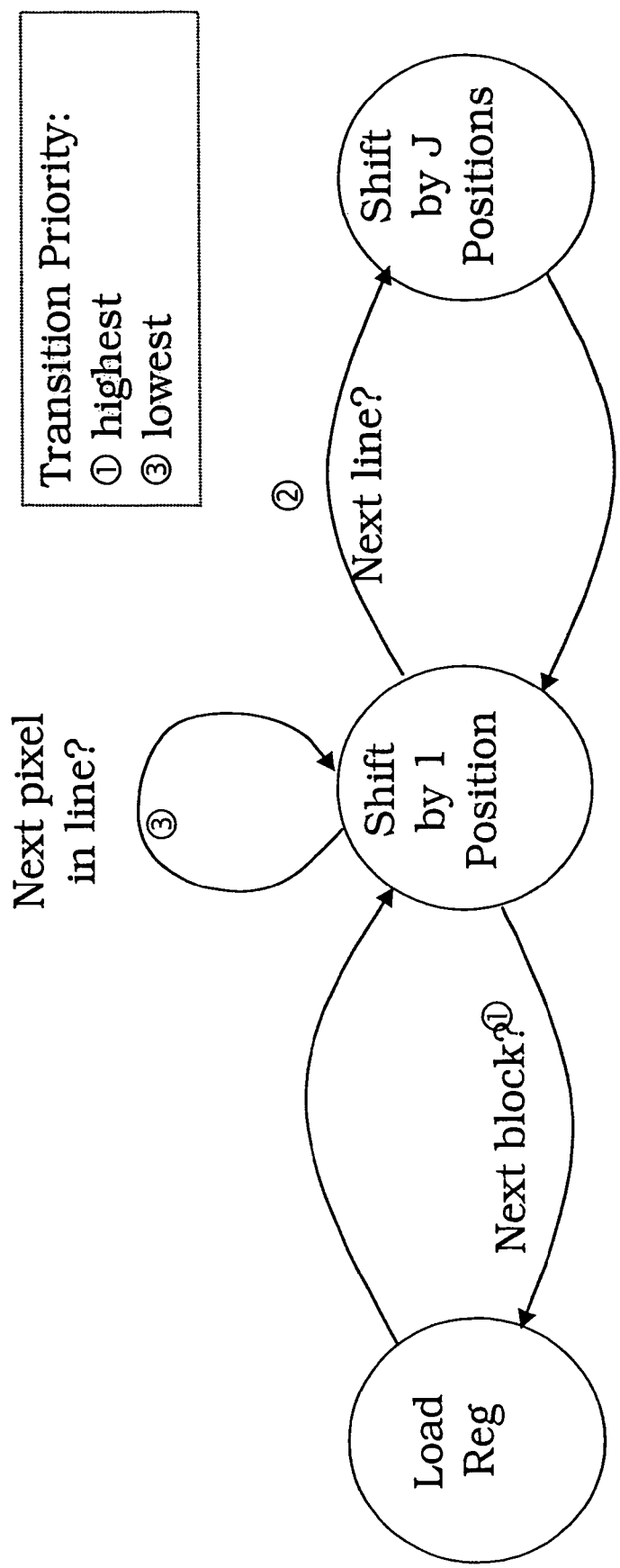
FIG. 5 is a schematical block diagram of a state machine or a state machine process used within the present invention.

All shift and reload operations may be controlled by a state-machine or state machine process as is shown in FIG. 5.

During "Load Reg"-state all registers of the [(L+J)−1]× [(M+K)−1] array are reinitialized. Parallel or sequential register reload is possible. After register loading, the state-machine switches to the "Shift by 1 position"-state. In this state, all pixels are shifted one position to the left, which means that they are replaced by their right neighbor pixel. Shifting pixels left is equivalent to moving the J×K filter in FIG. 3 one position to the right. After processing all pixels of the first line, processing continues with the first pixel of the second line. This is achieved by shifting all pixels J positions to the left. Afterwards the state-machine switches back to the "Shift by 1 Position"-state until the second line is processed and so on. At the end of the last line in an L×M block, the state-machine receives the trigger condition "next block", which means another restart of the whole block processing cycle.

Figure 6A:
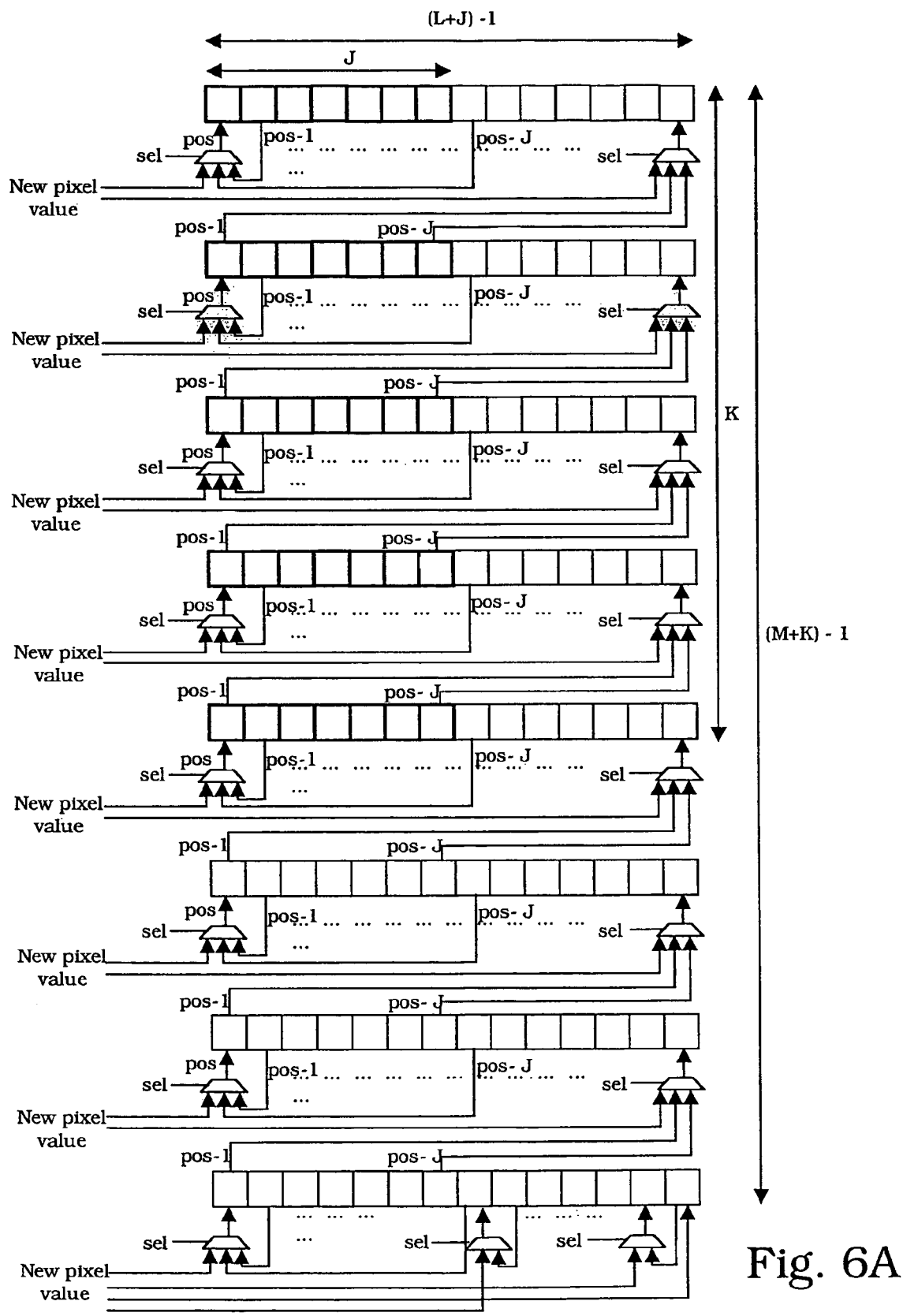
FIG. 6A, B are schematical diagrams of a shift register and of its operation which both can be used to realize the present invention.

A structure of a possible cache buffer realizing the embedding data block EDB is shown in FIG. 6A.

Each box represents a pixel of n parallel bits of e.g. typical values of 8 or 10 bits per pixel. The first J pixels of the first K lines are directly connected to the J×K filter input. The cache buffer is organized as shift register. It consists of [(M+K)−1] lines with each line containing [(L+J)−1] pixels. All lines and pixels are connected in a way that the last pixel of a line is followed by the first pixel of the next line and so on. Instead of moving the J×K filter over the L×M block, which would need large multiplexers at the filter input, the J×K filter mask always stays at the same position relative to the shift register, while the pixels are shifted. After each shift operation, the pixels in the J×K filter input array move to the new position needed for the calculation of the next result pixel. A 3-input multiplexer is assigned to each pixel in order to select the appropriate shift operation.

Figure 6B:
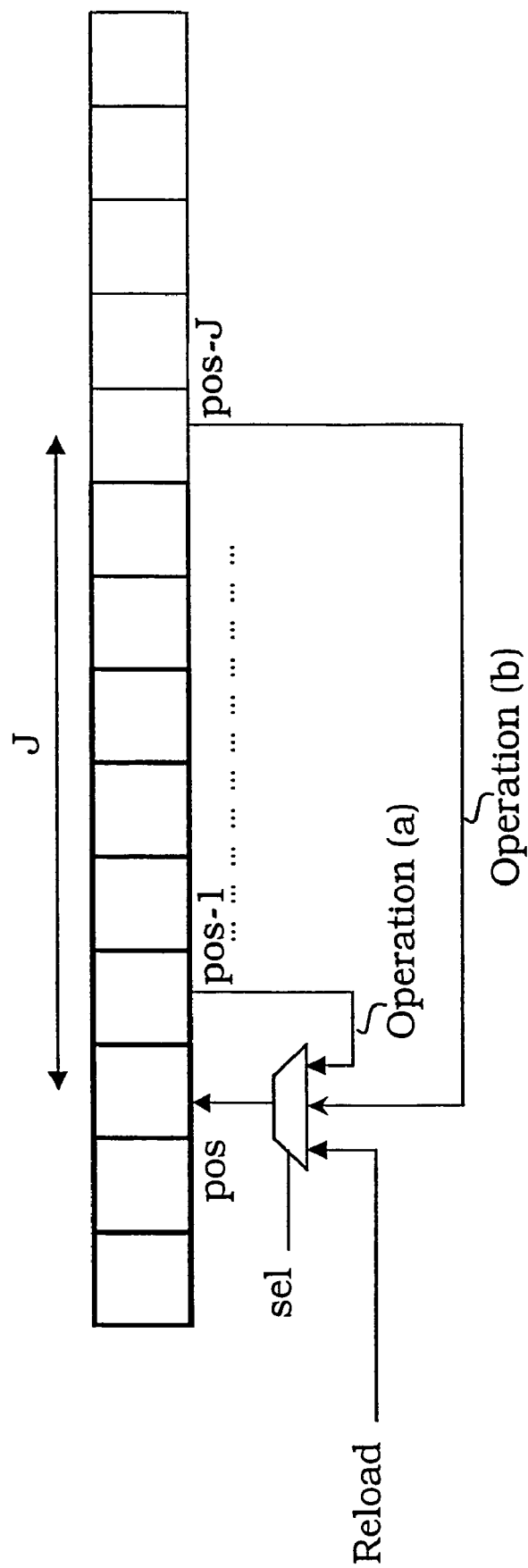

FIG. 6B illustrates the respective operation (a) and the respective operation (b) as described above.

Figure 7A:
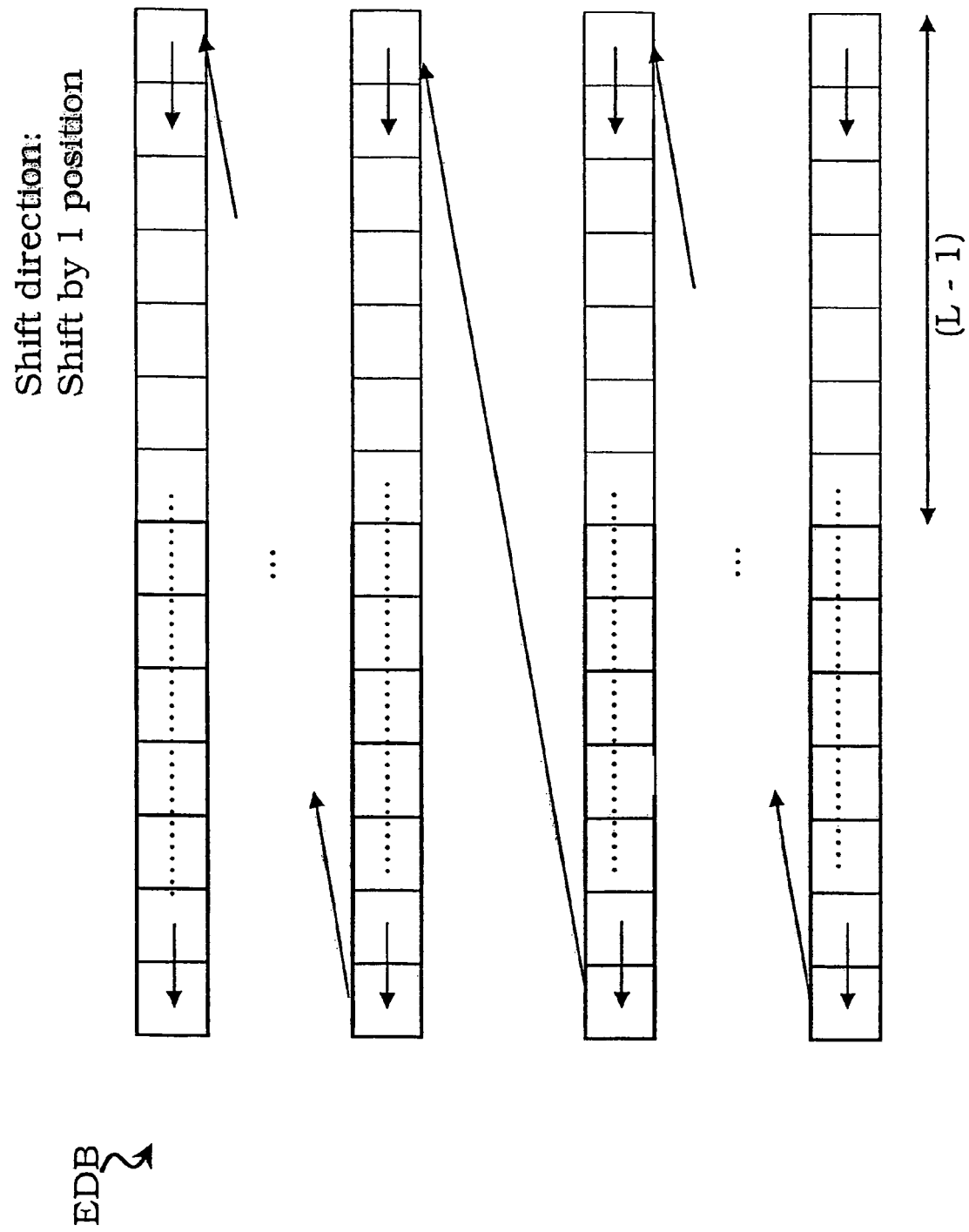
FIG. 7A, B demonstrate by means of schematical block diagrams data shift operations, which can be used within the present invention.
Figure 7B:
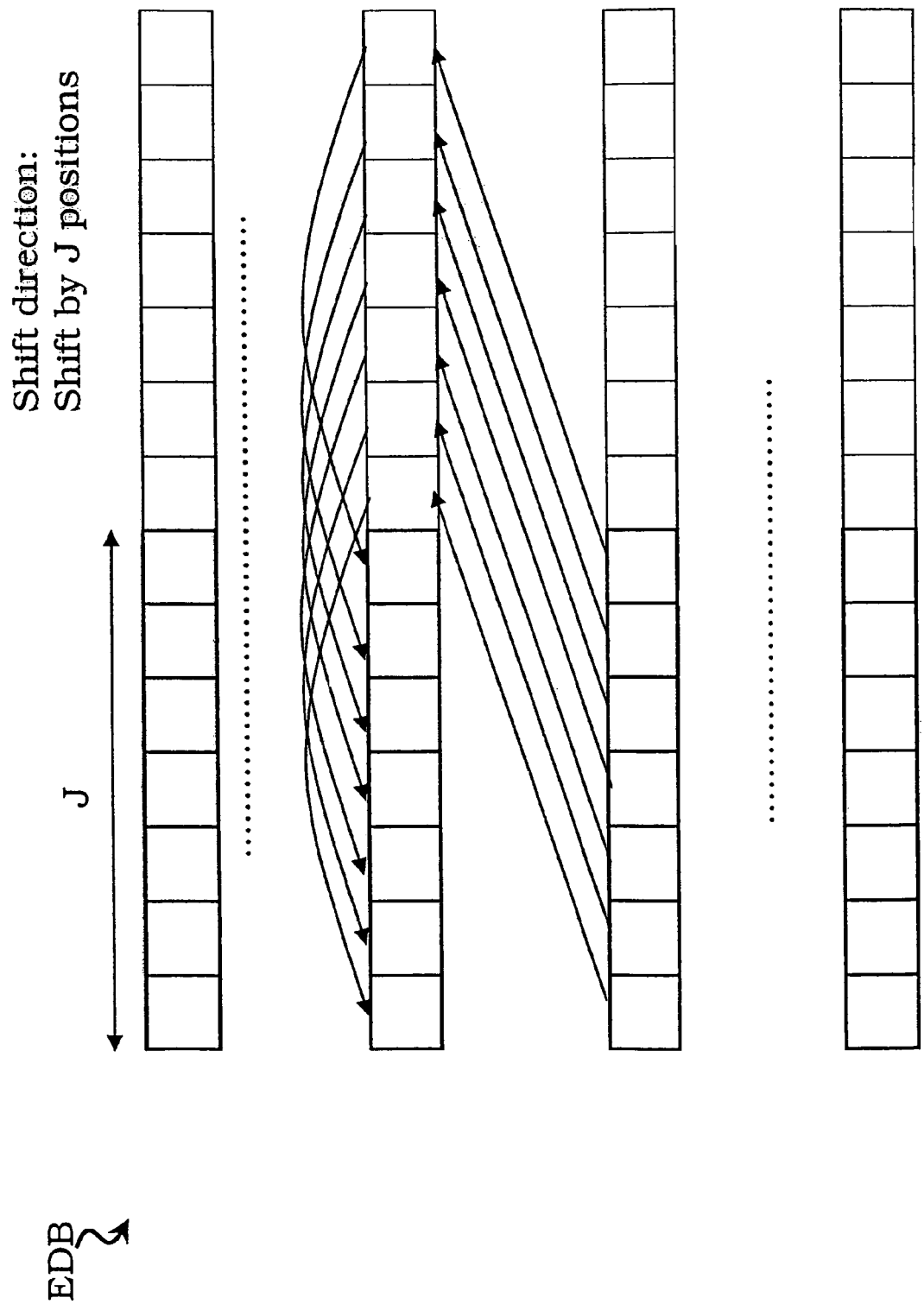

Three different operations are possible:

1. Load new cache content, i.e. a new data block DB to be pre-processed. Thereby, replace all data pixels by completely new values.
2. Process or pre-process a next data pixel of a given data block DB. Therefore, shift all data pixels one position to the left, wherein the first data pixel of each line is shifted to the end of the upper line as is shown in FIG. 7A.
3. Perform a line jump. This is done by shifting all data pixels J positions to the left, wherein the first J data pixels of each line or row are moved to the last J positions of the upper line or row as is shown in FIG. 7B.

The register loading strategy depends on the video data processing speed of the implemented filter.

Figure 8A:
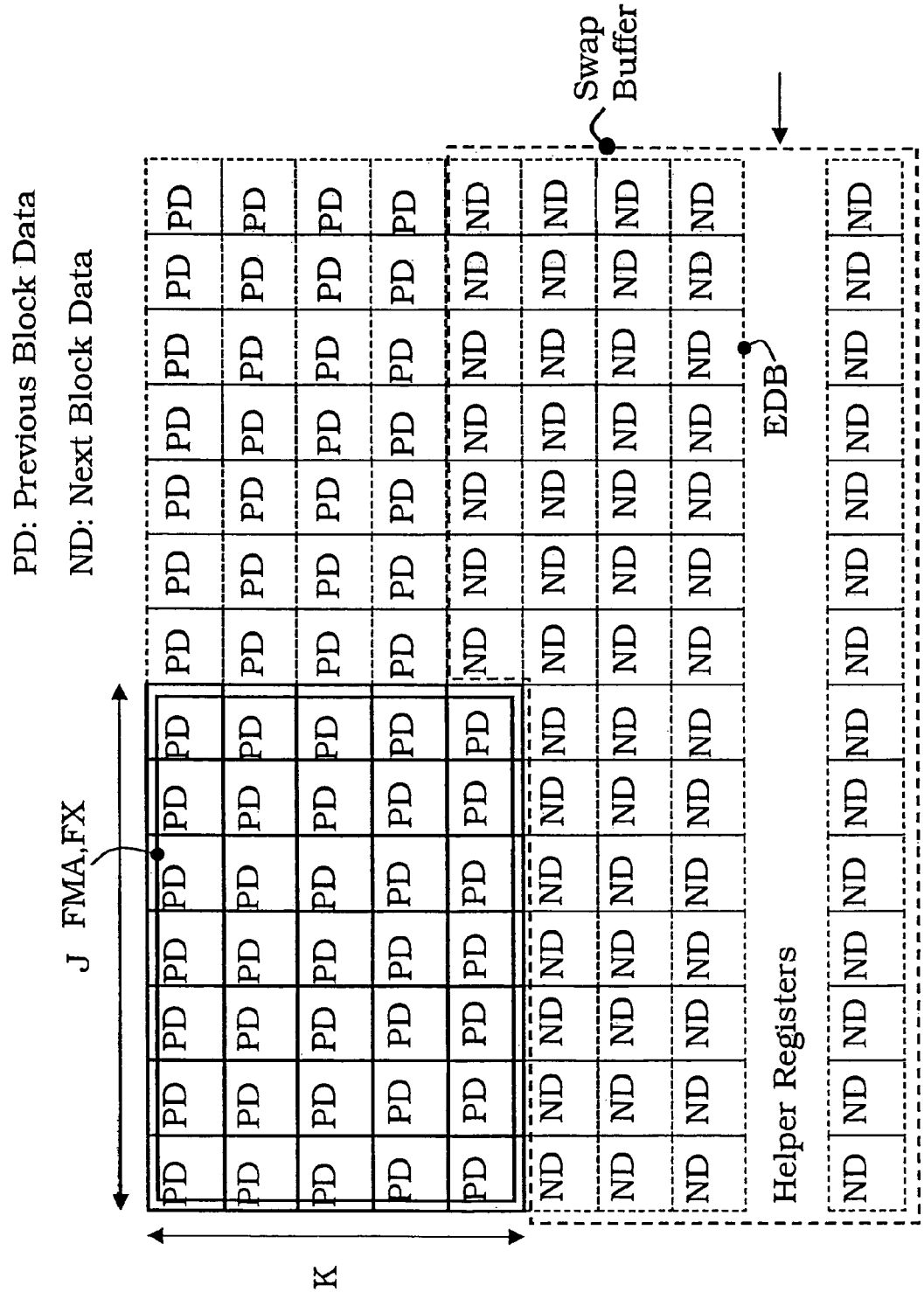
FIG. 8A, B are schematical block diagrams demonstrating further details of preferred embodiments of the present invention.

Blank positions inside the shift register can be refilled continuously with new video data of the next processing block as shown in FIG. 8A. After processing the last pixel of the previous video block, previous block data can be replaced by the block data of the next processing block. During the time needed for video data replacement, video signal processing has to be interrupted in order to avoid invalid filter input data mixed from the previous and next video block.

Figure 8B:
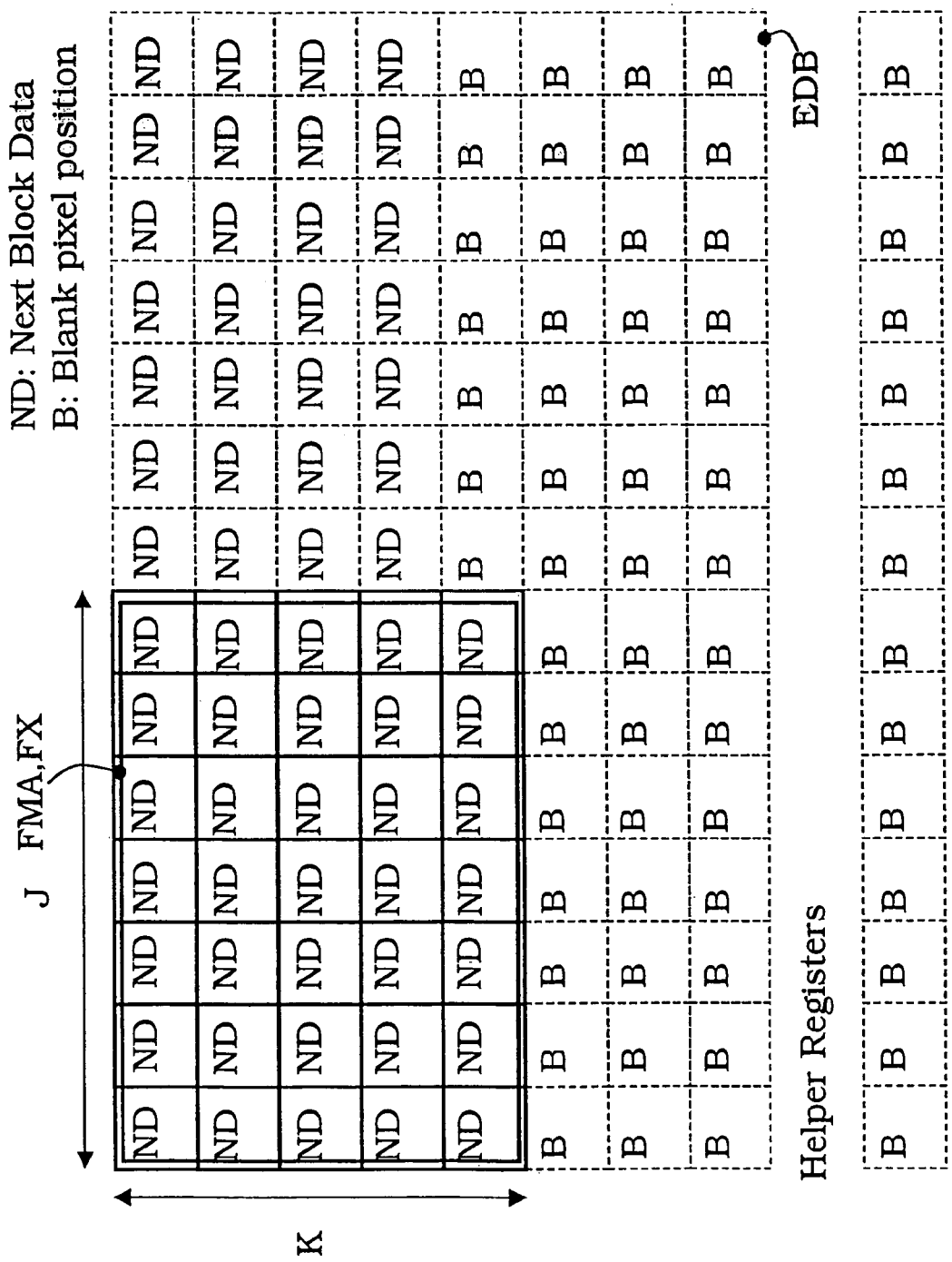

If it is not possible to interrupt video data processing during data replacement time, at least some lines of next block video data have to be copied from a swap buffer to the filter processing area of the shift register in a single step operation. In order to have enough next block video data in the swap buffer, some additional helper registers might be necessary. After performing the swap operation the shift register is shown in FIG. 8B. All next block data have been copied to the processing area of the shift register and the processing of the first video pixel of the next video block can be started. In order to keep the shift register running without further interruption, blank positions of the shift register have to be filled with the rest of next block video data.

REFERENCE SYMBOLS

B blank pixel
DB data block to be processed/pre-processed

DB' copy data block to be processed/pre-processed
DP, DPk,j data item/data pixel belonging to row/line k and column j
DP', DPk,j' copy of data item/data pixel belonging to row/line k and column j
DS input data stream of digital data to be processed/pre-processed
DS' output or processed/pre-processed data stream
DF, DF1 data field of data stream; (l=1, ..., n)
DF', DF1' processed/pre-processed data field of processed/pre-processed data stream
DM, DM1 data arrangement/matrix for data field DF, DF1; (l=1, ..., n)
DM', DM1' processed/pre-processed data arrangement/matrix for data field DF, DF1; (l=1, ..., n)
EDB embedding data block, shift register area/block
Fk,j data filter arrangement/matrix belonging to data pixel DPk,j
FMA filter mask, filter mask area
J number of rows/lines of data filter arrangement/matrix Fk,j and/or of filter mask area FMA
K number of columns of data filter arrangement/matrix Fk,j and/or of filter mask area FMA
L number of columns of data block DB, DB', PDB
M number of rows/lines of data block DB, DB', PDB
PDB processed/pre-processed data block
PDP, PDPk,j processed/pre-processed data item/pixel belonging to row/line and column j
X selected data item/pixel of data block DB
X' copy of selected data item/pixel of data block DB'

The invention claimed is:

1. A method for pre-processing block-based pixel data, comprising:
    loading an embedding data block into a cache memory, the embedding data block including at least one data sub-block having M-lines and L-columns of pixel data from the embedding data block;
    assigning a respective data filter matrix with more than one entry to each pixel data of the data sub-block, the data filter matrix being formed from K lines and J columns of the embedding data block, the embedding data block including M+K−1 lines and L+J−1 columns of pixel data;
    filtering the data sub-block with the respective data filter matrix, starting with a leftmost upper pixel data with respect to the respective data filter matrix;
    performing a first shift operation including,
        shifting, for each line of the embedding data block, all pixel data of a last L−1 columns J-times to the left while simultaneously shifting, for each line of the embedding data block except a first line, all pixel data of a first J columns of the embedding data block to a last J columns of a next lower indexed line of the embedding data block, and
        canceling the pixel data of the first J columns of the first line of the embedding data block.

2. The method according to claim 1, wherein said respective pixel data is in a central region of the respective data filter matrix.

3. The method according to claim 1, wherein said respective pixel data is the central pixel data of the respective data filter matrix.

4. The method according to claim 1, wherein for all data filter matrices, for a given data sub-block to be pre-processed, a common and fixed filter mask area within said embedding data block is used.

5. The method according to claim 1, wherein said respective data sub-block is pre-processed row by row, starting with a top row of said data sub-block.

6. The method according to claim 5, wherein within each row or line the respective pixel data is pre-processed in sequential order with respect to the columns of the data sub-block.

7. the method according to claim 1, further comprising:
    performing a second shift operation including,
        shifting all pixel data of the embedding data block one step to the left, in the case of a pixel data of a first column to the last column of the next lower indexed row or the embedding data block, or
        canceling the respective pixel data from the embedding data block if it is in the first column of the first line.

8. The method according to claim 7, further comprising:
    pre-processing the pixel data by sequentially M−1-times applying for each line L−1-times the second shift operation followed by the first shift operation, and by using the data filter matrix after each of said first and second shift operations.

9. The method according to claim 1, wherein a shift register is used to store said embedding data block, the shift register having M+K−1 rows and L+J−1 columns of pixel registers.

10. The method according to claim 9, wherein each pixel register is provided with a 3-input multiplexer configured to select at least one of the first or second shift operations.

11. The method according to claim 1, which is controlled by a state machine or a state machine process.

12. A system for pre-processing block-based digital data, comprising:
    a pixel register;
    cache memory configured to store an embedding data block including at least one data sub-block having M-lines and L-columns of pixel data from the embedding data block,
    wherein the system is configured to,
    assign a respective data filter matrix with more than one entry to each pixel data of the data sub-block, the data filter matrix being formed from K lines and J columns of the embedding data block, the embedding data block including M+K−1 lines and L+J−1 columns of pixel data,
    filter the data sub-block with the respective data filter matrix, starting with the leftmost upper pixel data with respect to the respective data filter matrix,
    perform a first shift operation including,
        shifting, for each line of the embedding data block, all pixel data of a last L−1 columns J-times to the left while simultaneously shifting, for each line of the embedding data block except a first line, all pixel data of a first J columns of the embedding data block to a last J columns of a next lower indexed line of the embedding data block, and
        canceling the pixel data of the first J columns of the first line of the embedding data block.

13. Computer readable storage medium storing computer readable instructions thereon, the computer readable instructions when executed by a processor cause the processor to perform the method comprising:
    loading an embedding data block into a cache memory, the embedding data block including at least one data sub-block of M-lines and L-columns of pixel data from the embedding data block;
    assigning a respective data filter matrix with more than one entry to each pixel data of the data sub-block, the data filter matrix being formed from K lines and J columns of the embedding data block, the embedding data block including M+K−1 lines and L+J−1 columns of pixel data;

filtering the data sub-block with the respective data filter matrix, starting with the leftmost upper pixel data with respect to the respective data filter matrix;

performing a first shift operation including,
shifting, for each line of the embedding data block, all pixel data of a last L−1 columns J-times to the left while simultaneously shifting, for each line of the embedding data block except a first line, all pixel data of a first J columns of the embedding data block to a last J columns of a next lower indexed line of the embedding data block, and canceling the pixel data of the first J columns of the first line of the embedding data block.

* * * * *